US011789863B2

(12) United States Patent
Schatzl et al.

(10) Patent No.: US 11,789,863 B2
(45) Date of Patent: Oct. 17, 2023

(54) ON-THE-FLY REMEMBERED SET DATA STRUCTURE ADAPTATION

(71) Applicant: Oracle International Corporation, Redwood Shores, CA (US)

(72) Inventors: Thomas Schatzl, Linz (AT); Ivan Walulya, Kungälv (SE)

(73) Assignee: Oracle International Corporation, Redwood Shores, CA (US)

( * ) Notice: Subject to any disclaimer, the term of this patent is extended or adjusted under 35 U.S.C. 154(b) by 280 days.

(21) Appl. No.: 17/369,447

(22) Filed: Jul. 7, 2021

(65) Prior Publication Data

US 2023/0019686 A1    Jan. 19, 2023

(51) Int. Cl.
*G06F 12/02* (2006.01)

(52) U.S. Cl.
CPC .. *G06F 12/0253* (2013.01); *G06F 2212/7205* (2013.01)

(58) Field of Classification Search
CPC ............... G06F 12/0253; G06F 2212/7205
See application file for complete search history.

(56) References Cited

U.S. PATENT DOCUMENTS

| | | | | |
|---|---|---|---|---|
| 7,287,049 B1* | 10/2007 | Printezis | ............ | G06F 12/0253 |
| 10,318,585 B2 | 6/2019 | Schatzl et al. | | |
| 11,507,503 B1* | 11/2022 | Osterlund | ................ | G06F 5/01 |
| 2004/0167945 A1* | 8/2004 | Garthwaite | ........... | G06F 9/4493 |
| | | | | 711/E12.012 |
| 2006/0294165 A1* | 12/2006 | Bacon | ................ | G06F 12/0253 |
| 2008/0005520 A1* | 1/2008 | Siegwart | ............ | G06F 12/0253 |
| | | | | 711/170 |
| 2008/0235307 A1* | 9/2008 | Siegwart | ............ | G06F 12/0253 |
| 2009/0327372 A1* | 12/2009 | Ylonen | ............... | G06F 12/0253 |
| 2010/0057792 A1* | 3/2010 | Ylonen | ............... | G06F 12/0253 |
| | | | | 707/E17.009 |

(Continued)

OTHER PUBLICATIONS

"GitHub—RoaringBitmap RoaringFormatSpec Specification of the compressed-bitmap Roaring Format," accessed at https://github.com/RoaringBitmap/RoaringFormatSpec/, accessed on Jul. 8, 2021, pp. 8.

(Continued)

*Primary Examiner* — Eliyah S. Harper
(74) *Attorney, Agent, or Firm* — Invoke

(57) ABSTRACT

Techniques for on-the-fly adaptation of remembered set data structures are disclosed. Operations include initiating execution of an application thread and a garbage collection process for a heap memory including a first plurality of logical partitions, wherein each logical partition of the first plurality of logical partitions is associated with a remembered set data structure. While the application thread and the garbage collection process are executing, the system determines a set of characteristics. Based on the set of characteristics meeting threshold criteria for adjusting a first remembered set data structure corresponding to a first logical partition, the system identifies a first remembered set configuration corresponding to the first remembered set data structure, creates a replacement remembered set data structure based on the first remembered set configuration, and associates the replacement remembered set data structure with the first logical partition.

20 Claims, 8 Drawing Sheets

(56) References Cited

U.S. PATENT DOCUMENTS

| | | | | |
|---|---|---|---|---|
| 2011/0145304 A1* | 6/2011 | Gray | ................... | G06F 12/0253 |
| | | | | 707/820 |
| 2011/0185144 A1* | 7/2011 | Printezis | ............ | G06F 12/0269 |
| | | | | 718/1 |
| 2011/0252075 A1* | 10/2011 | Ylonen | ................... | G06F 9/522 |
| | | | | 707/E17.007 |
| 2011/0252216 A1* | 10/2011 | Ylonen | ..................... | G06F 9/52 |
| | | | | 711/170 |
| 2012/0310998 A1* | 12/2012 | Burka | ................. | G06F 9/45504 |
| | | | | 707/813 |
| 2017/0153973 A1* | 6/2017 | Schatzl | .............. | G06F 16/9027 |
| 2018/0357008 A1* | 12/2018 | Hirt | ........................ | G06F 12/02 |

OTHER PUBLICATIONS

"Roaring Bitmaps," accessed at https://roaringbitmap.org, accessed on Jul. 8, 2021, pp. 2.

* cited by examiner

ON-THE-FLY REMEMBERED SET DATA STRUCTURE ADAPTATION

TECHNICAL FIELD

The present disclosure relates to memory management and garbage collection. In particular, the present disclosure relates to on-the-fly adaptation of remembered set data structures in a generational garbage collection process.

BACKGROUND

A compiler converts source code, which is written according to a specification directed to the convenience of the programmer, to machine or object code. Machine or object code is executable directly by the particular machine environment. Alternatively, a compiler converts source code to an intermediate representation ("virtual machine code/instructions"), such as bytecode, which is executable by a virtual machine that is capable of running on top of a variety of particular machine environments. The virtual machine instructions are executable by the virtual machine in a more direct and efficient manner than the source code. Converting source code to virtual machine instructions includes mapping source code functionality from the language to virtual machine functionality that utilizes underlying resources, such as data structures. Often, functionality that is presented in simple terms via source code by the programmer is converted into more complex steps that map more directly to the instruction set supported by the underlying hardware on which the virtual machine resides.

A virtual machine executes an application and/or program by executing an intermediate representation of the source code, such as bytecode. An interpreter of the virtual machine converts the intermediate representation into machine code. As the application is executed, certain memory (also referred to as "heap memory") is allocated for objects created by the program. A garbage collection system may be used to automatically reclaim memory locations occupied by objects that are no longer being used by the application. Garbage collection systems free the programmer from having to explicitly specify which objects to deallocate. Generational garbage collection schemes are based on the empirical observation that most objects are used for only a short period of time. In generational garbage collection two or more allocation regions (generations) are designated, and are kept separate based on ages of the objects contained therein. New objects are created in the "young" generation that is regularly collected, and when a generation is full, the objects that are still referenced by one or more objects stored in an older-generation region are copied into (i.e., "promoted to") the next oldest generation. Occasionally a full scan is performed.

In generational garbage collection systems, it is desirable to perform garbage collection on a particular region of the heap memory (e.g., the "young" generation) without traversing the entire heap memory to determine whether references from outside of the particular region of the heap memory refer to the objects within the particular region. A remembered set is used to keep track of references. In particular, a remembered set associated with a given region contains information about references into that region from locations outside of the given region.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ARCHITECTURAL OVERVIEW
   2.1 EXAMPLE CLASS FILE STRUCTURE
   2.2 EXAMPLE VIRTUAL MACHINE ARCHITECTURE
   2.3 LOADING, LINKING, AND INITIALIZING
3. GARBAGE COLLECTION
4. REMEMBERED SETS
5. ON-THE-FLY REMEMBERED SET DATA STRUCTURE ADAPTATION
6. MISCELLANEOUS; EXTENSIONS
7. HARDWARE OVERVIEW

1. General Overview

One or more embodiments include causing a garbage collection process to track characteristics of an executing application thread, storage limitations imposed by a user, and storage efficiency of remembered set data structures for one or more regions of a heap memory. This tracking may allow the garbage collection process to configure the remembered set data structure to improve memory use on-the-fly (e.g., without halting execution of the garbage control process or the application thread).

There are many goals to consider when adapting the remembered set data structures. In particular, the garbage collection process may adapt the remembered set data structure(s) to limit access latency during collection (decreasing garbage collection time to meet user service level agreements), to improve memory use of a single remembered set data structure, to improve overall remembered set data structure memory use, or to adapt the memory set data structure to meet a service level agreement that changes over time and/or memory constraints that may change over time. Additionally or alternatively, the garbage collection process may adapt the remembered set data structures based on changing phases of the executing application thread. In particular, the executing application thread may have different needs during, for example, a startup phase, a loaded phase, and an idle phase.

In some embodiments, adapting the remembered set may include, for example, selecting a different remembered set data structure for storing the remembered set or adjusting one or more features of a remembered set data structure. Additionally or alternatively, adapting the remembered set data structures may include altering a size of cards in a region of the heap to adjust a number of remembered set data structures. There are many ways in which the remembered set may be adapted.

One or more embodiments described in this Specification and/or recited in the claims may not be included in this General Overview section.

2. Architectural Overview

Figure 1:
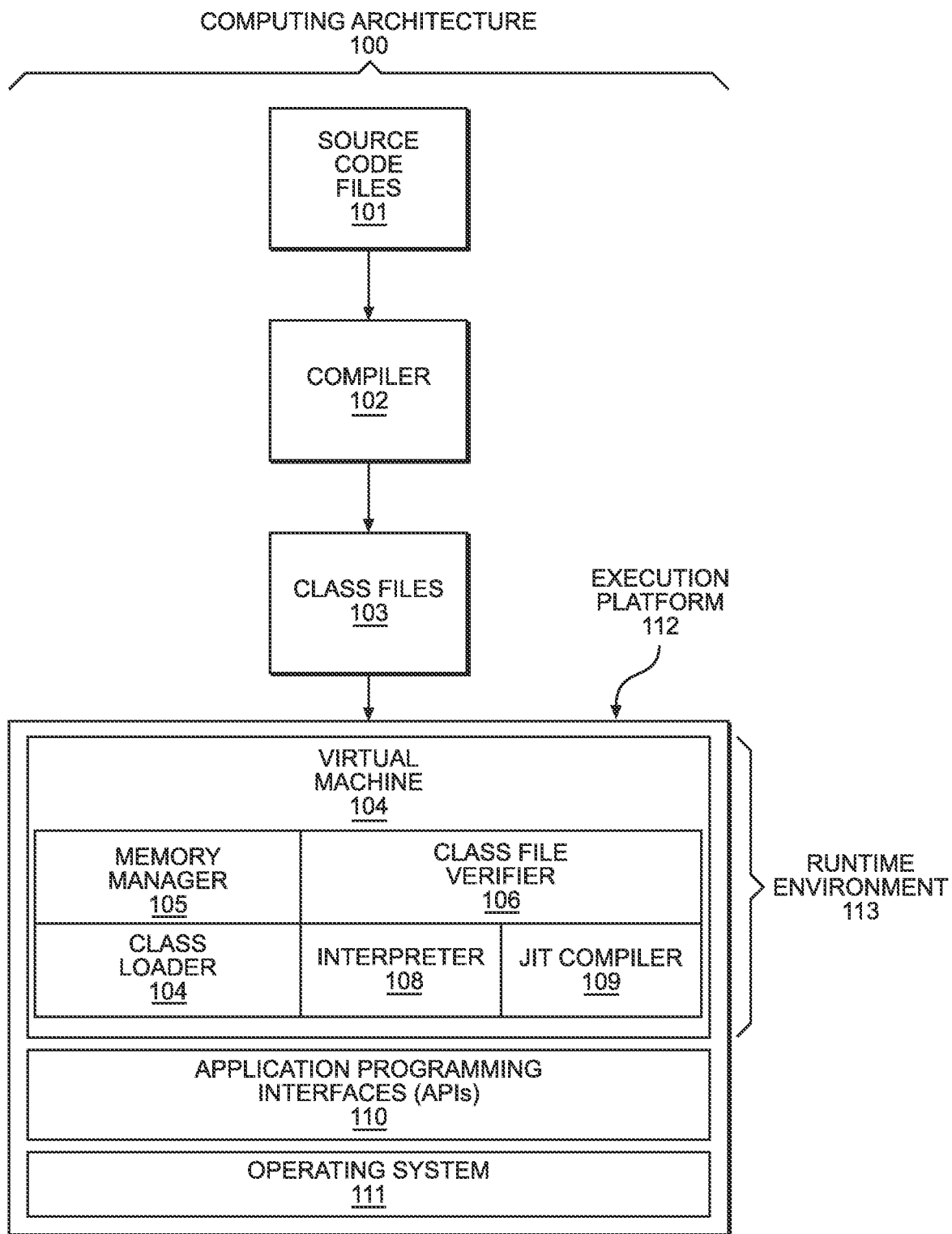
FIG. 1 illustrates an example computing architecture in which techniques described herein may be practiced.

FIG. 1 illustrates an example architecture in which techniques described herein may be practiced. Software and/or hardware components described with relation to the example architecture may be omitted or associated with a different set of functionalities than described herein. Software and/or hardware components, not described herein, may be used within an environment in accordance with one or more embodiments. Accordingly, the example environment should not be constructed as limiting the scope of any of the claims.

As illustrated in FIG. 1, a computing architecture 100 includes source code files 101 which are compiled by a compiler 102 into class files 103 representing the program to be executed. The class files 103 are then loaded and executed by an execution platform 112, which includes a runtime environment 113, an operating system 111, and one or more application programming interfaces (APIs) 110 that enable communication between the runtime environment 113 and the operating system 111. The runtime environment 113 includes a virtual machine 104 comprising various components, such as a memory manager 105 (which may include a garbage collector), a class file verifier 106 to check the validity of class files 103, a class loader 107 to locate and build in-memory representations of classes, an interpreter 108 for executing the virtual machine 104 code, and a just-in-time (JIT) compiler 109 for producing optimized machine-level code.

In an embodiment, the computing architecture 100 includes source code files 101 that contain code that has been written in a particular programming language, such as Java, C, C++, C#, Ruby, Perl, and so forth. Thus, the source code files 101 adhere to a particular set of syntactic and/or semantic rules for the associated language. For example, code written in Java adheres to the Java Language Specification. However, since specifications are updated and revised over time, the source code files 101 may be associated with a version number indicating the revision of the specification to which the source code files 101 adhere. The exact programming language used to write the source code files 101 is generally not critical.

In various embodiments, the compiler 102 converts the source code, which is written according to a specification directed to the convenience of the programmer, to either machine or object code, which is executable directly by the particular machine environment, or an intermediate representation ("virtual machine code/instructions"), such as bytecode, which is executable by a virtual machine 104 that is capable of running on top of a variety of particular machine environments. The virtual machine instructions are executable by the virtual machine 104 in a more direct and efficient manner than the source code. Converting source code to virtual machine instructions includes mapping source code functionality from the language to virtual machine functionality that utilizes underlying resources, such as data structures. Often, functionality that is presented in simple terms via source code by the programmer is converted into more complex steps that map more directly to the instruction set supported by the underlying hardware on which the virtual machine 104 resides.

In general, programs are executed either as a compiled or an interpreted program. When a program is compiled, the code is transformed globally from a first language to a second language before execution. Since the work of transforming the code is performed ahead of time; compiled code tends to have excellent run-time performance. In addition, since the transformation occurs globally before execution, the code can be analyzed and optimized using techniques such as constant folding, dead code elimination, inlining, and so forth. However, depending on the program being executed, the startup time can be significant. In addition, inserting new code would require the program to be taken offline, re-compiled, and re-executed. For many dynamic languages (such as Java) which are designed to allow code to be inserted during the program's execution, a purely compiled approach may be inappropriate. When a program is interpreted, the code of the program is read line-by-line and converted to machine-level instructions while the program is executing. As a result, the program has a short startup time (can begin executing almost immediately), but the run-time performance is diminished by performing the transformation on the fly. Furthermore, since each instruction is analyzed individually, many optimizations that rely on a more global analysis of the program cannot be performed.

In some embodiments, the virtual machine 104 includes an interpreter 108 and a JIT compiler 109 (or a component implementing aspects of both), and executes programs using a combination of interpreted and compiled techniques. For example, the virtual machine 104 may initially begin by interpreting the virtual machine instructions representing the program via the interpreter 108 while tracking statistics related to program behavior, such as how often different sections or blocks of code are executed by the virtual machine 104. Once a block of code surpasses a threshold (is "hot"), the virtual machine 104 invokes the JIT compiler 109 to perform an analysis of the block and generate optimized machine-level instructions which replaces the "hot" block of code for future executions. Since programs tend to spend most time executing a small portion of overall code, compiling just the "hot" portions of the program can provide similar performance to fully compiled code, but without the start-up penalty. Furthermore, although the optimization analysis is constrained to the "hot" block being replaced, there still exists far greater optimization potential than converting each instruction individually. There are a number of variations on the above described example, such as tiered compiling.

In order to provide clear examples, the source code files 101 have been illustrated as the "top level" representation of the program to be executed by the execution platform 112. Although the computing architecture 100 depicts the source code files 101 as a "top level" program representation, in other embodiments the source code files 101 may be an intermediate representation received via a "higher level" compiler that processed code files in a different language into the language of the source code files 101. Some examples in the following disclosure assume that the source code files 101 adhere to a class-based object-oriented programming language. However, this is not a requirement to utilizing the features described herein.

In an embodiment, compiler 102 receives as input the source code files 101 and converts the source code files 101 into class files 103 that are in a format expected by the virtual machine 104. For example, in the context of the JVM, the Java Virtual Machine Specification defines a particular class file format to which the class files 103 are expected to adhere. In some embodiments, the class files 103 contain the virtual machine instructions that have been converted from the source code files 101. However, in other embodiments, the class files 103 may contain other structures as well, such as tables identifying constant values and/or metadata related to various structures (classes, fields, methods, and so forth).

The following discussion assumes that each of the class files 103 represents a respective "class" defined in the source code files 101 (or dynamically generated by the compiler 102/virtual machine 104). However, the aforementioned assumption is not a strict requirement and will depend on the implementation of the virtual machine 104. Thus, the techniques described herein may still be performed regardless of the exact format of the class files 103. In some embodiments, the class files 103 are divided into one or more "libraries" or "packages", each of which includes a collection of classes that provide related functionality. For example, a library may contain one or more class files that implement input/output (I/O) operations, mathematics tools, cryptographic techniques, graphics utilities, and so forth. Further, some classes (or fields/methods within those classes) may include access restrictions that limit their use to within a particular class/library/package or to classes with appropriate permissions.

2.1 Example Class File Structure

Figure 2:
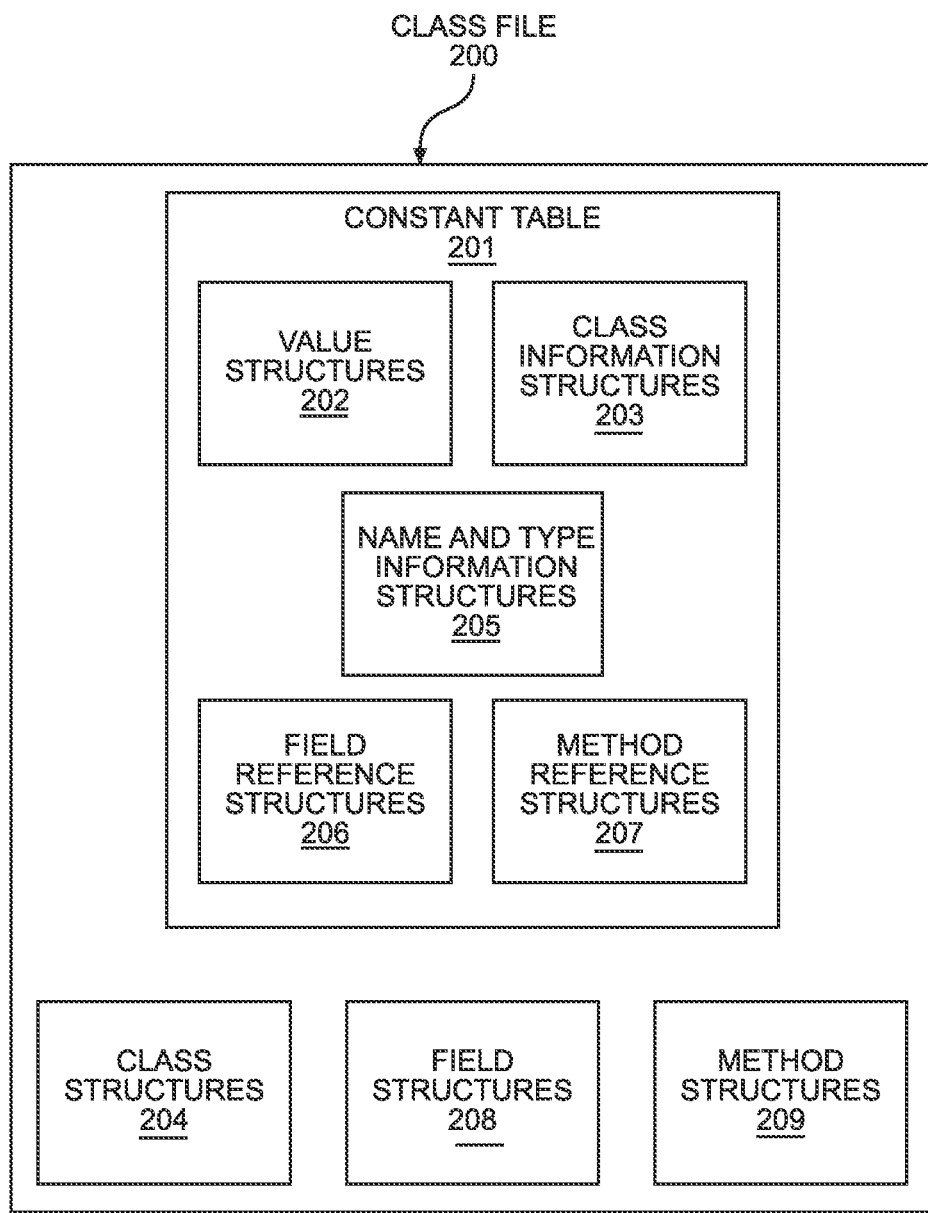
FIG. 2 is a block diagram illustrating one embodiment of a computer system suitable for implementing methods and features described herein.

FIG. 2 illustrates an example structure for a class file 200 in block diagram form according to an embodiment. In order to provide clear examples, the remainder of the disclosure assumes that the class files 103 of the computing architecture 100 adhere to the structure of the example class file 200 described in this section. However, in a practical environment, the structure of the class file 200 will be dependent on the implementation of the virtual machine 104. Further, one or more features discussed herein may modify the structure of the class file 200 to, for example, add additional structure types. Therefore, the exact structure of the class file 200 is not critical to the techniques described herein. For the purposes of Section 2.1, "the class" or "the present class" refers to the class represented by the class file 200.

In FIG. 2, the class file 200 includes a constant table 201, field structures 208, class metadata 207, and method structures 209. In an embodiment, the constant table 201 is a data structure which, among other functions, acts as a symbol table for the class. For example, the constant table 201 may store data related to the various identifiers used in the source code files 101 such as type, scope, contents, and/or location. The constant table 201 has entries for value structures 202 (representing constant values of type int, long, double, float, byte, string, and so forth), class information structures 203, name and type information structures 204, field reference structures 205, and method reference structures 206 derived from the source code files 101 by the compiler 102. In an embodiment, the constant table 201 is implemented as an array that maps an index i to structure j. However, the exact implementation of the constant table 201 is not critical.

In some embodiments, the entries of the constant table 201 include structures which index other constant table 201 entries. For example, an entry for one of the value structures 202 representing a string may hold a tag identifying its "type" as string and an index to one or more other value structures 202 of the constant table 201 storing char, byte or int values representing the ASCII characters of the string.

In an embodiment, field reference structures 205 of the constant table 201 hold an index into the constant table 201 to one of the class information structures 203 representing the class defining the field and an index into the constant table 201 to one of the name and type information structures 204 that provides the name and descriptor of the field. Method reference structures 206 of the constant table 201 hold an index into the constant table 201 to one of the class information structures 203 representing the class defining the method and an index into the constant table 201 to one of the name and type information structures 204 that provides the name and descriptor for the method. The class information structures 203 hold an index into the constant table 201 to one of the value structures 202 holding the name of the associated class.

The name and type information structures 204 hold an index into the constant table 201 to one of the value structures 202 storing the name of the field/method and an index into the constant table 201 to one of the value structures 202 storing the descriptor.

In an embodiment, class metadata 207 includes metadata for the class, such as version number(s), number of entries in the constant pool, number of fields, number of methods, access flags (whether the class is public, private, final, abstract, etc.), an index to one of the class information structures 203 of the constant table 201 that identifies the present class, an index to one of the class information structures 203 of the constant table 201 that identifies the superclass (if any), and so forth.

In an embodiment, the field structures 208 represent a set of structures that identifies the various fields of the class. The field structures 208 store, for each field of the class, accessor flags for the field (whether the field is static, public, private, final, etc.), an index into the constant table 201 to one of the value structures 202 that holds the name of the field, and an index into the constant table 201 to one of the value structures 202 that holds a descriptor of the field.

In an embodiment, the method structures 209 represent a set of structures that identifies the various methods of the class. The method structures 209 store, for each method of the class, accessor flags for the method (e.g. whether the method is static, public, private, synchronized, etc.), an index into the constant table 201 to one of the value structures 202 that holds the name of the method, an index into the constant table 201 to one of the value structures 202 that holds the descriptor of the method, and the virtual machine instructions that correspond to the body of the method as defined in the source code files 101.

In an embodiment, a descriptor represents a type of a field or method. For example, the descriptor may be implemented as a string adhering to a particular syntax. While the exact syntax is not critical, a few examples are described below.

In an example where the descriptor represents a type of the field, the descriptor identifies the type of data held by the field. In an embodiment, a field can hold a basic type, an object, or an array. When a field holds a basic type, the descriptor is a string that identifies the basic type (e.g., "B"=byte, "C"=char, "D"=double, "F"=float, "I"=int, "J"=long int, etc.). When a field holds an object, the descriptor is a string that identifies the class name of the object (e.g. "L ClassName"). "L" in this case indicates a reference, thus "L ClassName" represents a reference to an object of class ClassName. When the field is an array, the descriptor identifies the type held by the array. For example, "[B" indicates an array of bytes, with "[" indicating an array and "B" indicating that the array holds the basic type of byte. However, since arrays can be nested, the descriptor for an array may also indicate the nesting. For example, "[[L ClassName" indicates an array where each index holds an array that holds objects of class ClassName. In some embodiments, the ClassName is fully qualified and includes the simple name of the class, as well as the pathname of the class. For example, the ClassName may indicate where the file is stored in the package, library, or file system hosting the class file 200.

In the case of a method, the descriptor identifies the parameters of the method and the return type of the method. For example, a method descriptor may follow the general form "({ParameterDescriptor}) ReturnDescriptor", where the {ParameterDescriptor} is a list of field descriptors representing the parameters and the ReturnDescriptor is a field descriptor identifying the return type. For instance, the string "V" may be used to represent the void return type. Thus, a method defined in the source code files 101 as "Object m(int I, double d, Thread t) { ... }" matches the descriptor "(I D L Thread) L Object".

In an embodiment, the virtual machine instructions held in the method structures 209 include operations which reference entries of the constant table 201. Using Java as an example, consider the following class:

```
class A
{
    int add12and13( ) {
        return B.addTwo(12, 13);
    }
}
```

In the above example, the Java method add12and13 is defined in class A, takes no parameters, and returns an integer. The body of method add12and13 calls static method addTwo of class B which takes the constant integer values 12 and 13 as parameters, and returns the result. Thus, in the constant table 201, the compiler 102 includes, among other entries, a method reference structure that corresponds to the call to the method B.addTwo. In Java, a call to a method compiles down to an invoke command in the bytecode of the JVM (in this case invokestatic as addTwo is a static method of class B). The invoke command is provided an index into the constant table 201 corresponding to the method reference structure that identifies the class defining addTwo "B", the name of addTwo "addTwo", and the descriptor of addTwo "(I I)I". For example, assuming the aforementioned method reference is stored at index 4, the bytecode instruction may appear as "invokestatic #4".

Since the constant table 201 refers to classes, methods, and fields symbolically with structures carrying identifying information, rather than direct references to a memory location, the entries of the constant table 201 are referred to as "symbolic references". One reason that symbolic references are utilized for the class files 103 is because, in some embodiments, the compiler 102 is unaware of how and where the classes will be stored once loaded into the runtime environment 113. As will be described in Section 2.3, eventually the run-time representations of the symbolic references are resolved into actual memory addresses by the virtual machine 104 after the referenced classes (and associated structures) have been loaded into the runtime environment and allocated concrete memory locations.

2.2 Example Virtual Machine Architecture

Figure 3:
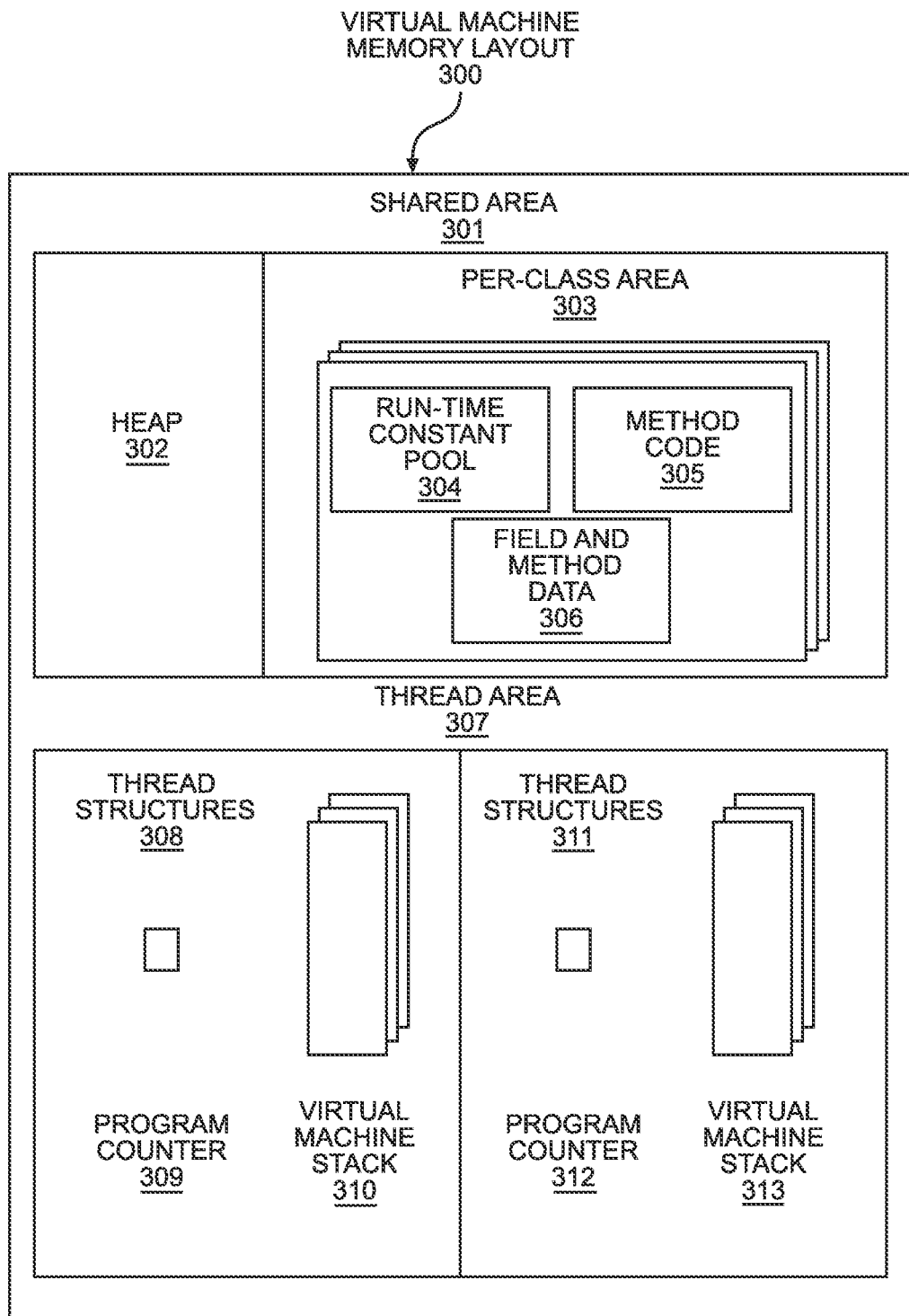
FIG. 3 illustrates an example virtual machine memory layout in block diagram form according to an embodiment.

FIG. 3 illustrates an example virtual machine memory layout 300 in block diagram form according to an embodiment. In order to provide clear examples, the remaining discussion will assume that the virtual machine 104 adheres to the virtual machine memory layout 300 depicted in FIG. 3. In addition, although components of the virtual machine memory layout 300 may be referred to as memory "areas", there is no requirement that the memory areas be contiguous.

In the example illustrated by FIG. 3, the virtual machine memory layout 300 is divided into a shared area 301 and a thread area 307. The shared area 301 represents an area in memory where structures shared among the various threads executing on the virtual machine 104 are stored. The shared area 301 includes a heap 302 and a per-class area 303. In an embodiment, the heap 302 represents the run-time data area from which memory for class instances and arrays is allocated. In an embodiment, the per-class area 303 represents the memory area where the data pertaining to the individual classes are stored. In an embodiment, the per-class area 303 includes, for each loaded class, a run-time constant pool 304 representing data from the constant table 201 of the class, field and method data 306 (for example, to hold the static fields of the class), and the method code 305 representing the virtual machine instructions for methods of the class.

The thread area 307 represents a memory area where structures specific to individual threads are stored. In FIG. 3, the thread area 307 includes thread structures 308 and thread structures 311, representing the per-thread structures utilized by different threads. In order to provide clear examples, the thread area 307 depicted in FIG. 3 assumes two threads are executing on the virtual machine 104. However, in a practical environment, the virtual machine 104 may execute any arbitrary number of threads, with the number of thread structures scaled accordingly.

In an embodiment, thread structures 308 includes program counter 309 and virtual machine stack 310. Similarly, thread structures 311 includes program counter 312 and virtual machine stack 313. In an embodiment, program counter 309 and program counter 312 store the current address of the virtual machine instruction being executed by their respective threads.

Thus, as a thread steps through the instructions, the program counters are updated to maintain an index to the current instruction. In an embodiment, virtual machine stack 310 and virtual machine stack 313 each store frames for their respective threads that hold local variables and partial results, and is also used for method invocation and return.

In an embodiment, a frame is a data structure used to store data and partial results, return values for methods, and perform dynamic linking. A new frame is created each time a method is invoked. A frame is destroyed when the method that caused the frame to be generated completes. Thus, when a thread performs a method invocation, the virtual machine 104 generates a new frame and pushes that frame onto the virtual machine stack associated with the thread.

When the method invocation completes, the virtual machine 104 passes back the result of the method invocation to the previous frame and pops the current frame off of the stack. In an embodiment, for a given thread, one frame is active at any point. This active frame is referred to as the current frame, the method that caused generation of the current frame is referred to as the current method, and the class to which the current method belongs is referred to as the current class.

Figure 4:
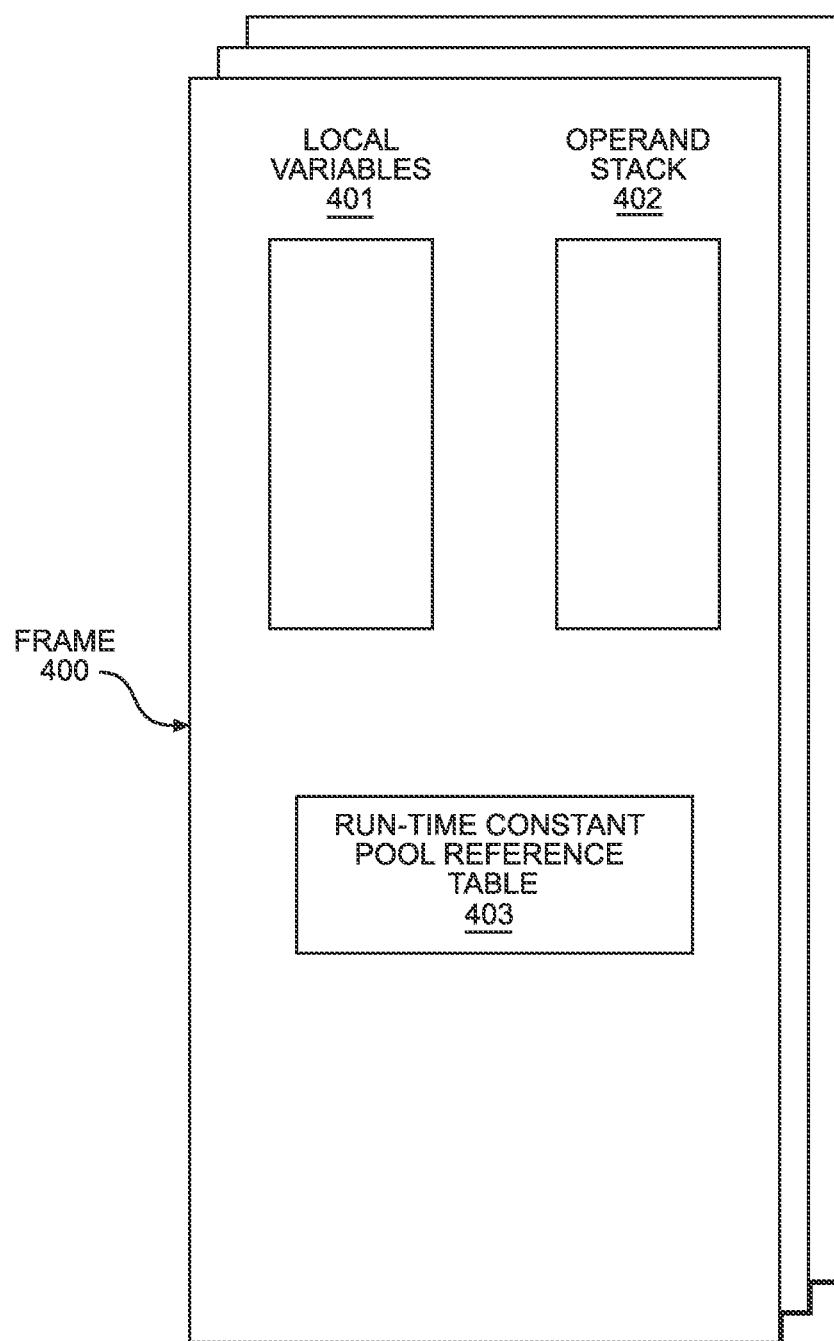
FIG. 4 illustrates an example frame in block diagram form according to an embodiment.

FIG. 4 illustrates an example frame 400 in block diagram form according to an embodiment. In order to provide clear examples, the remaining discussion will assume that frames of virtual machine stack 310 and virtual machine stack 313 adhere to the structure of frame 400.

In an embodiment, frame 400 includes local variables 401, operand stack 402, and run-time constant pool reference table 403. In an embodiment, the local variables 401 are represented as an array of variables that each hold a value, for example, Boolean, byte, char, short, int, float, or reference. Further, some value types, such as longs or doubles, may be represented by more than one entry in the array. The local variables 401 are used to pass parameters on method invocations and store partial results. For example, when generating the frame 400 in response to invoking a method, the parameters may be stored in predefined positions within the local variables 401, such as indexes 1-N corresponding to the first to Nth parameters in the invocation.

In an embodiment, the operand stack 402 is empty by default when the frame 400 is created by the virtual machine 104. The virtual machine 104 then supplies instructions from the method code 305 of the current method to load constants or values from the local variables 401 onto the operand stack 402. Other instructions take operands from the operand stack 402, operate on them, and push the result back onto the operand stack 402. Furthermore, the operand stack 402 is used to prepare parameters to be passed to methods and to receive method results. For example, the parameters of the method being invoked could be pushed onto the operand stack 402 prior to issuing the invocation to the method. The virtual machine 104 then generates a new frame for the method invocation where the operands on the operand stack 402 of the previous frame are popped and loaded into the local variables 401 of the new frame. When the invoked method terminates, the new frame is popped from the virtual machine stack and the return value is pushed onto the operand stack 402 of the previous frame.

In an embodiment, the run-time constant pool reference table 403 contains a reference to the run-time constant pool 304 of the current class. The run-time constant pool reference table 403 is used to support resolution. Resolution is the process whereby symbolic references in the constant pool 304 are translated into concrete memory addresses, loading classes as necessary to resolve as-yet-undefined symbols and translating variable accesses into appropriate offsets into storage structures associated with the run-time location of these variables.

2.3 Loading, Linking, and Initializing

In an embodiment, the virtual machine 104 dynamically loads, links, and initializes classes. Loading is the process of finding a class with a particular name and creating a representation from the associated class file 200 of that class within the memory of the runtime environment 113. For example, creating the run-time constant pool 304, method code 305, and field and method data 306 for the class within the per-class area 303 of the virtual machine memory layout 300. Linking is the process of taking the in-memory representation of the class and combining it with the run-time state of the virtual machine 104 so that the methods of the class can be executed. Initialization is the process of executing the class constructors to set the starting state of the field and method data 306 of the class and/or create class instances on the heap 302 for the initialized class.

The following are examples of loading, linking, and initializing techniques that may be implemented by the virtual machine 104. However, in many embodiments the steps may be interleaved, such that an initial class is loaded, then during linking a second class is loaded to resolve a symbolic reference found in the first class, which in turn causes a third class to be loaded, and so forth. Thus, progress through the stages of loading, linking, and initializing can differ from class to class. Further, some embodiments may delay (perform "lazily") one or more functions of the loading, linking, and initializing process until the class is actually required. For example, resolution of a method reference may be delayed until a virtual machine instruction invoking the method is executed. Thus, the exact timing of when the steps are performed for each class can vary greatly between implementations.

To begin the loading process, the virtual machine 104 starts up by invoking the class loader 107 which loads an initial class. The technique by which the initial class is specified will vary from embodiment to embodiment. For example, one technique may have the virtual machine 104 accept a command line argument on startup that specifies the initial class.

To load a class, the class loader 107 parses the class file 200 corresponding to the class and determines whether the class file 200 is well-formed (meets the syntactic expectations of the virtual machine 104). If not, the class loader 107 generates an error. For example, in Java the error might be generated in the form of an exception which is thrown to an exception handler for processing. Otherwise, the class loader 107 generates the in-memory representation of the class by allocating the run-time constant pool 304, method code 305, and field and method data 306 for the class within the per-class area 303.

In some embodiments, when the class loader 107 loads a class, the class loader 107 also recursively loads the super-classes of the loaded class. For example, the virtual machine 104 may ensure that the super-classes of a particular class are loaded, linked, and/or initialized before proceeding with the loading, linking and initializing process for the particular class.

During linking, the virtual machine 104 verifies the class, prepares the class, and performs resolution of the symbolic references defined in the run-time constant pool 304 of the class.

To verify the class, the virtual machine 104 checks whether the in-memory representation of the class is structurally correct. For example, the virtual machine 104 may check that each class except the generic class Object has a superclass, check that final classes have no sub-classes and final methods are not overridden, check whether constant pool entries are consistent with one another, check whether the current class has correct access permissions for classes/fields/structures referenced in the constant pool 304, check that the virtual machine 104 code of methods will not cause unexpected behavior (e.g. making sure a jump instruction does not send the virtual machine 104 beyond the end of the method), and so forth. The exact checks performed during verification are dependent on the implementation of the virtual machine 104. In some cases, verification may cause additional classes to be loaded, but does not necessarily require those classes to also be linked before proceeding. For example, assume Class A contains a reference to a static field of Class B. During verification, the virtual machine 104 may check Class B to ensure that the referenced static field actually exists, which might cause loading of Class B, but not necessarily the linking or initializing of Class B. However, in some embodiments, certain verification checks can be delayed until a later phase, such as being checked during resolution of the symbolic references. For example, some embodiments may delay checking the access permissions for symbolic references until those references are being resolved.

To prepare a class, the virtual machine 104 initializes static fields located within the field and method data 306 for the class to default values. In some cases, setting the static fields to default values may not be the same as running a constructor for the class. For example, the verification process may zero out or set the static fields to values that the constructor would expect those fields to have during initialization.

During resolution, the virtual machine 104 dynamically determines concrete memory address from the symbolic references included in the run-time constant pool 304 of the class. To resolve the symbolic references, the virtual machine 104 utilizes the class loader 107 to load the class identified in the symbolic reference (if not already loaded). Once loaded, the virtual machine 104 has knowledge of the memory location within the per-class area 303 of the referenced class and its fields/methods. The virtual machine 104 then replaces the symbolic references with a reference to the concrete memory location of the referenced class, field, or method. In an embodiment, the virtual machine 104 caches resolutions to be reused in case the same class/name/descriptor is encountered when the virtual machine 104 processes another class. For example, in some cases, class A and class B may invoke the same method of class C. Thus, when resolution is performed for class A, that result can be cached and reused during resolution of the same symbolic reference in class B to reduce overhead.

In some embodiments, the step of resolving the symbolic references during linking is optional. For example, an embodiment may perform the symbolic resolution in a "lazy" fashion, delaying the step of resolution until a virtual machine instruction that requires the referenced class/method/field is executed.

During initialization, the virtual machine 104 executes the constructor of the class to set the starting state of that class. For example, initialization may initialize the field and method data 306 for the class and generate/initialize any class instances on the heap 302 created by the constructor. For example, the class file 200 for a class may specify that a particular method is a constructor that is used for setting up the starting state. Thus, during initialization, the virtual machine 104 executes the instructions of that constructor.

In some embodiments, the virtual machine 104 performs resolution on field and method references by initially checking whether the field/method is defined in the referenced class. Otherwise, the virtual machine 104 recursively searches through the super-classes of the referenced class for the referenced field/method until the field/method is located, or the top-level superclass is reached, in which case an error is generated.

3. Garbage Collection

Figure 5:
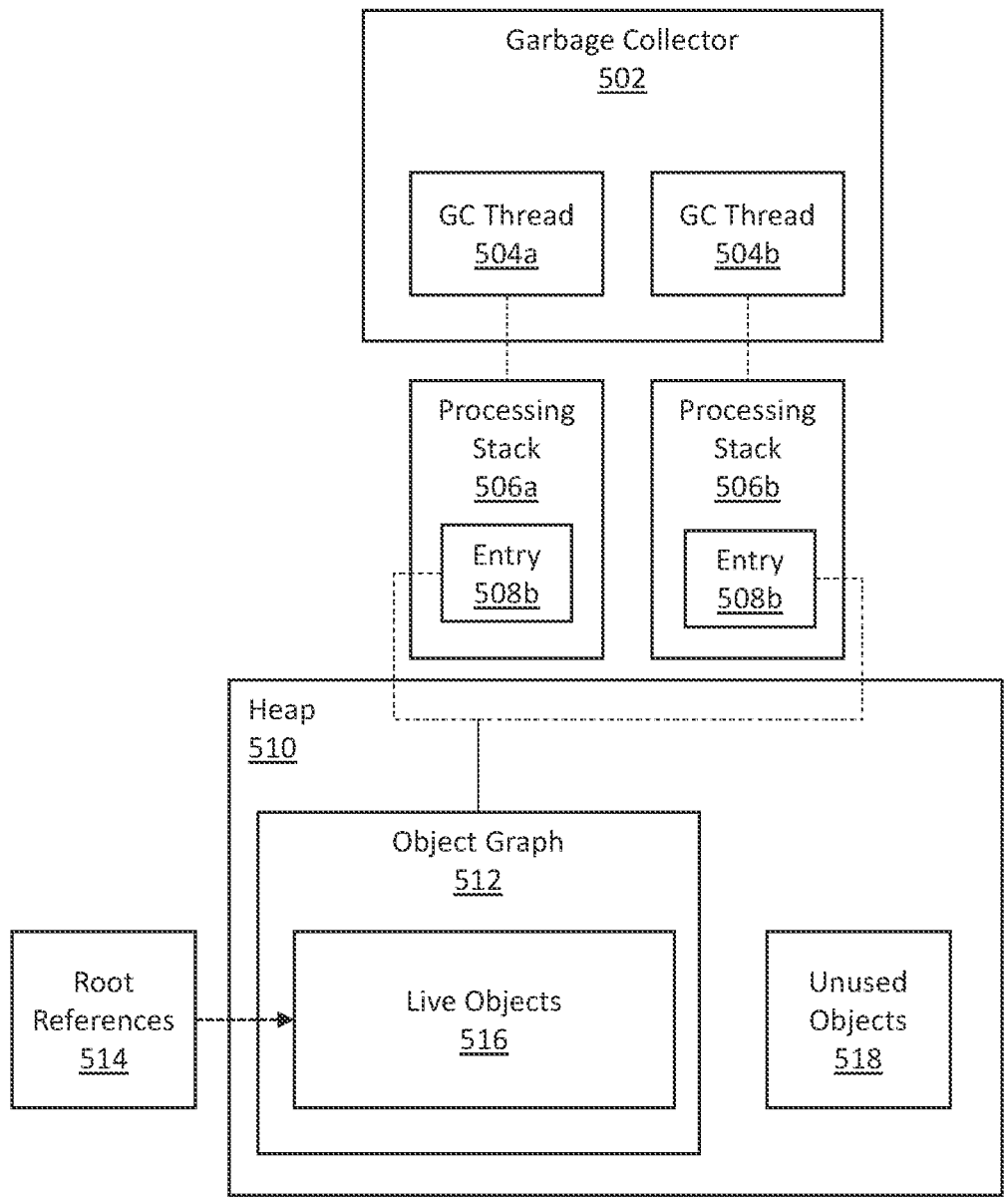
FIG. 5 illustrates example garbage collection system for processing objects in a heap, in accordance with an embodiment.

FIG. 5 illustrates an example garbage collection system for processing objects in a heap, in accordance with an embodiment. FIG. 5 includes garbage collector (GC) 502, GC threads 504*a-b*, processing stacks 506*a-b*, entries 508*a-b*, heap 510, object graph 512, root references 514, live objects 516, and unused objects 518.

As described above, a heap 510 (or heap 302 described above) represents the run-time data area from which memory for class instances and arrays is allocated. The heap 510 stores objects that are created during execution of a program. The heap 510 stores both live objects 516 and unused objects 518.

An object stored in a heap 510 may be a normal object, an object array, or another type of object. A normal object is a class instance. A class instance is explicitly created by a class instance creation expression. An object array is a container object that holds a fixed number of values of a single type. The object array is a particular set of normal objects. An object array is explicitly created by an array creation expression. The length of the object array is established when the object array is created and is thereafter fixed. Each element or item in the object array is accessed by a numerical index, beginning with the index zero (0). As an example, a program may include the following pseudo-code:

String myobject="11/15/2011";
String[ ] myarray=new String[2];
myarray[0]="11/16/2011";
myarray[1]="11/17/2011";

In this example, myobject is a normal object whose type is String and whose value is "11/15/2011." Further, myarray is an object array that holds two elements, each of which is associated with a type of String.myarray is a set of two normal object references whose type is String. The value of the object referenced by the first element is "11/16/2011." The value of the object referenced by the second element is "11/17/2011."

In an embodiment, an object graph 512 is a graph including nodes and edges. A node represents a live object 516. An edge represents a reference from one live object 516 to another live object 516. The root nodes of the object graph 512 include objects pointed to by root references 514. The remaining nodes of the object graph 512 include objects pointed to by another live object.

In an embodiment, a root reference 514 is a pointer to an object from which a traversal of an object graph 512 begins. A garbage collector 502 begins traversing an object graph 512 at a particular object referenced by a root reference 514. The garbage collector 502 identifies the particular object as a live object 516. The garbage collector 502 traces the particular object to identify other objects referenced by the particular object. The garbage collector 502 identifies the other objects referenced by the particular object as live objects 516. The root references 514 used by a garbage collector 502 may be determined by analyzing registers, global fields, and stack frames at the moment when a garbage collection process is triggered. Examples of objects referenced by root references 514 include a class loaded by an application class loader, a live thread (such as thread structures 308-311), and a local variable or parameter (such as local variables 401 and/or operand stack 402).

In an embodiment, a live object 516 (also referred to as an "in use object") refers to an object that is currently being referenced by an executing program. The program includes at least one reference to the live object 516. A live object 516 is an object that is reachable from an object referenced by a root reference 514.

In an embodiment, an unused object 518 (also referred to as an "unreferenced object" or a "dead object") refers to an object that is no longer referenced by any part of the executing program. The unused object 518 may be removed from memory. The memory originally used to store the unused object 518 may be reclaimed to store new live objects 516.

In one or more embodiments, a garbage collector 502 refers to hardware and/or software configured to identify and remove unused objects 518 stored in a heap 510. The garbage collector 502 may perform a garbage collection process at a scheduled interval and/or upon an event trigger. As an example, when a heap (or a region thereof) reaches a threshold value, the garbage collector 502 may perform a garbage collection process to remove unused objects 518 stored at the heap (or a region thereof).

A garbage collector 502 may include one or more GC threads 504*a*-*b* to perform operations in parallel. A GC thread identifies live objects 516 by tracing through an object graph 512. After identifying live objects 516, the GC thread performs various operations and/or algorithms to remove unused objects 518. Specific operations performed in removing unused object depends on the type of garbage collector 502 used.

As an example, one type of garbage collector 502 is a copying collector. The copying collector uses two separately defined address space of the heap, referred to as a "from-space" and a "to-space." The copying collector identifies live objects 516 stored within an area defined as a from-space. The copying collector copies the live objects 516 to another area defined as a to-space. After all live objects 516 are copied from the from-space to the to-space, the area defined as the from-space is reclaimed. New memory allocation may begin at the first location of the original from-space.

As another example, another type of garbage collector 502 is a mark-and-sweep collector. The mark-and-sweep collector utilizes at least two phases: a mark phase and a sweep phase. During the mark phase, the mark-and-sweep collector marks each live object 516 with a "live" bit. The live bit may be, for example, a bit within an object header of the live object 516. During the sweep phase, the mark-and-sweep collector traverses the heap to identify all non-marked chunks of consecutive memory address spaces. The mark-and-sweep collector links together the non-marked chunks into organized free lists. The non-marked chunks are reclaimed. New memory allocation is performed using the free lists. A new object may be stored in a memory chunk identified from the free lists.

The mark-and-sweep collector may be implemented as a parallel collector. The parallel collector includes multiple GC threads 504*a*-*b* working in parallel through the mark and sweep phases.

Additionally or alternatively, the mark-and-sweep collector may be implemented as a concurrent collector. At least some operations of a concurrent collector are performed while the executing program or application continues to run. Example stages of a concurrent collector include:

Stage 1: Identify the objects referenced by root references (this is not concurrent with the executing program)

Stage 2: Mark reachable objects from the objects referenced by the root references (this is concurrent)

Stage 3: Identify objects that have been modified as part of the execution of the program during Stage 2 (this is concurrent)

Stage 4: Re-mark the objects identified at Stage 3 (this is not concurrent)

Stage 5: Sweep the heap to obtain free lists and reclaim memory (this is concurrent)

As another example, another type of garbage collector 502 is a partially concurrent collector that also attempts to compact reclaimed memory areas. The heap is partitioned into a set of equally sized heap regions, each a contiguous range of virtual memory. The partially concurrent collector performs a concurrent global marking phase to determine the liveness of objects throughout the heap. After the marking phase completes, the partially concurrent collector identifies regions that are mostly empty. The partially concurrent collector collects these regions first, which often yields a large amount of free space. The partially concurrent collector concentrates its collection and compaction activity on the areas of the heap that are likely to be full of reclaimable objects, that is, garbage. The partially concurrent collector copies objects from one or more regions of the heap to a single region on the heap, and in the process both compacts and frees up memory. This evacuation is performed in parallel on multiprocessors to decrease pause times and increase throughput.

The partially concurrent collector pauses the executing application during one or more stages of the garbage collection process. The partially concurrent collector pauses the executing application to copy live objects to new regions. Additionally or alternatively, the partially concurrent collector pauses the executing application to identify and mark objects that have been modified, as part of the execution of the program, since start of the initial marking. Additionally or alternatively, the partially concurrent collector pauses the executing application to perform a cleanup phase, including identifying empty regions and determining old regions that are candidates for the next collection.

Each GC thread is associated with a processing stack (such as processing stack 506*a* or 506*b*). As described above, a GC thread identifies live objects 516 by tracing through an object graph 512. The GC thread uses a processing stack to track the traversal of the object graph 512. The processing stack stores references to objects that (a) have been identified as part of the traversal process and (b) have not yet been processed in accordance with a set of garbage collection operations.

A processing stack has a limited number of entries. If a GC thread attempts to store an additional entry in a processing stack after the maximum number of entries has been reached, an error may be generated. Alternatively, if a GC thread attempts to store an additional entry in a processing stack after the maximum number of entries has been reached, the GC thread may allocate a new processing stack. In addition, each entry of the processing stack stores a limited number of bits. As an example, each entry may store a maximum of 64 bits.

Entries stored on a processing stack, which is associated with a particular GC thread, may be distributed to other GC threads for load balancing purposes. As an example, processing stack 506*a* of GC thread 504*a* may include ten entries. At the same time, processing stack 506*b* of GC thread 504*b* may include zero entries. Five entries from processing stack 506*a* may be distributed to GC thread 504*b*. GC thread 504*b*, rather than GC thread 504*a*, processes the entries distributed from processing stack 506*a*. As a result, each of GC thread 504*a* and GC thread 504*b* processes five entries. As illustrated in this example, the loads of GC thread 504*a* and GC thread 504*b* are balanced.

4. Remembered Sets

Figure 6:
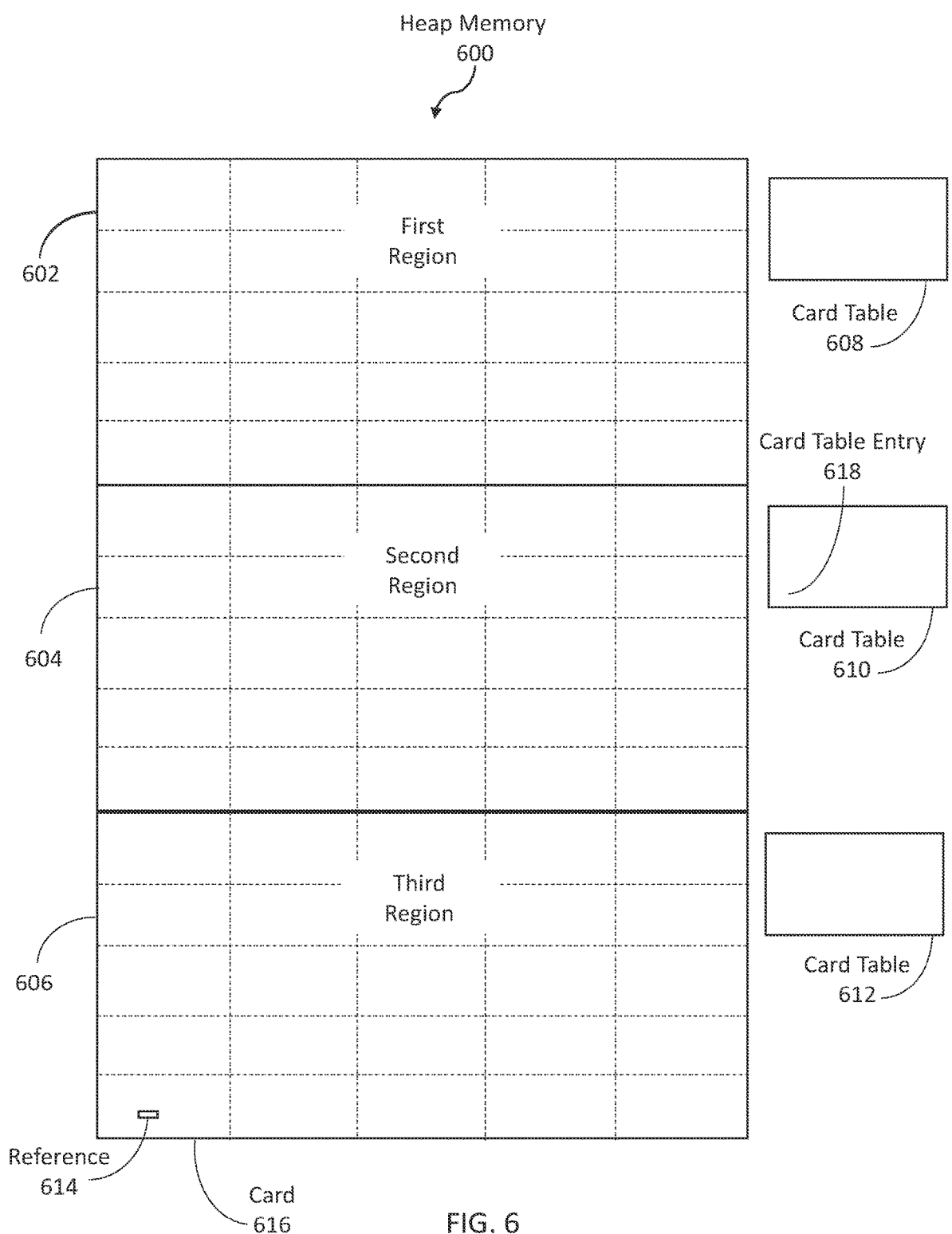
FIG. 6 illustrates an example remembered set structure.

Generational collection may greatly increase what is effectively the root set for a given region. Consider FIG. 6, which depicts a heap 600 (or heap 302 described above) that makes use of a remembered set implementation. As shown in FIG. 6, the heap 600 may be organized into three regions 602, 604, and 606, though more or fewer regions may be used. Only region 604 is to be collected during the current phase of the garbage collection process. To collect a single region, the root set must be considered to include not only the call stack, registers, and global variables, but also objects in the other regions 602 and 606, which themselves may contain references to objects in region 604. Accordingly pointers must be traced not only from the basic root set but also from objects within the other generations or regions.

This tracing could be performed by inspecting all references in all other regions at the beginning of every collection cycle. This approach may be feasible in some situations, but it takes too long in many situations. Accordingly, a number of approaches to expediting reference tracing may be employed. One approach is to include so-called write barriers in the mutator process. A write barrier is code added to a write operation to record information from which the collector can determine where references were or may have been written since the last collection cycle. A reference list can then be maintained by taking such a list as it existed at the end of the previous collection cycle and updating it by inspecting only locations identified by the write barrier as possibly modified since the last collection cycle. Such a reference list may be referred to as a "remembered set".

For example, a "card table" may be used record information associated with references. FIG. 6 depicts the various regions as being divided into smaller sections, known for this purpose as "cards" (e.g., card 616 of the third region 606). Card tables 608, 610, and 612 are associated with regions 602, 604, and 606, respectively. Each card table includes an entry for each of object in a different region that references an object in the associated region. Continuing the example above, if region 604 is to be collected, and reference 614 (stored in card 616 within region 606) includes a reference to an object stored in region 604, a card table entry 618 may be associated with the card 616 in the region 606. Each card table summarizes inter-regional references stored in the card associated with the card table entry. This remembered set data structure may be, for example, a singular binary indication of whether any address in the card includes an inter-regional reference, a binary indication of whether an inter-regional reference exists at each address within the card (e.g., a bitmap), a list of offsets indicating locations of inter-regional references within the card, or any other data structure that may be used to summarize intergenerational references. In some embodiments, each card table entry may be associated with a remembered set data structure of the same type. In other embodiments, a remembered set data structure may be selected independently for each card table entry. In embodiments, a card table entry 618 may include, for instance, an offset that indicates the location of an inter-regional reference 614 within the corresponding card 616.

Although there is no reason in principle to favor any particular number of regions (which may correspond to generations), and although FIG. 6 shows three, generational garbage collectors may include more or fewer generations, of which one is the young generation, and another is the mature generation. Moreover, while FIG. 6 shows the regions 602, 604, 606 as being of the same size, the regions need not be of equal size. Finally, although the above discussion assumed that collection during a given cycle was limited to only one region (generation), another approach is to collect the young generation at every cycle and to collect the mature generation less frequently.

To collect the young generation, it is preferable to employ the card table to identify pointers into the young generation; laboriously scanning the entire mature generation would take too long. On the other hand, since the young generation is collected in every cycle and can therefore be collected before mature-generation processing, it takes little time to scan the few remaining, live objects in the young generation for pointers into the mature generation in order to process that generation. For this reason, the card table will typically be so maintained as only to identify the regions occupied by references into younger generations and not into older ones.

5. On-the-Fly Remembered Set Data Structure Adaptation

Figure 7:
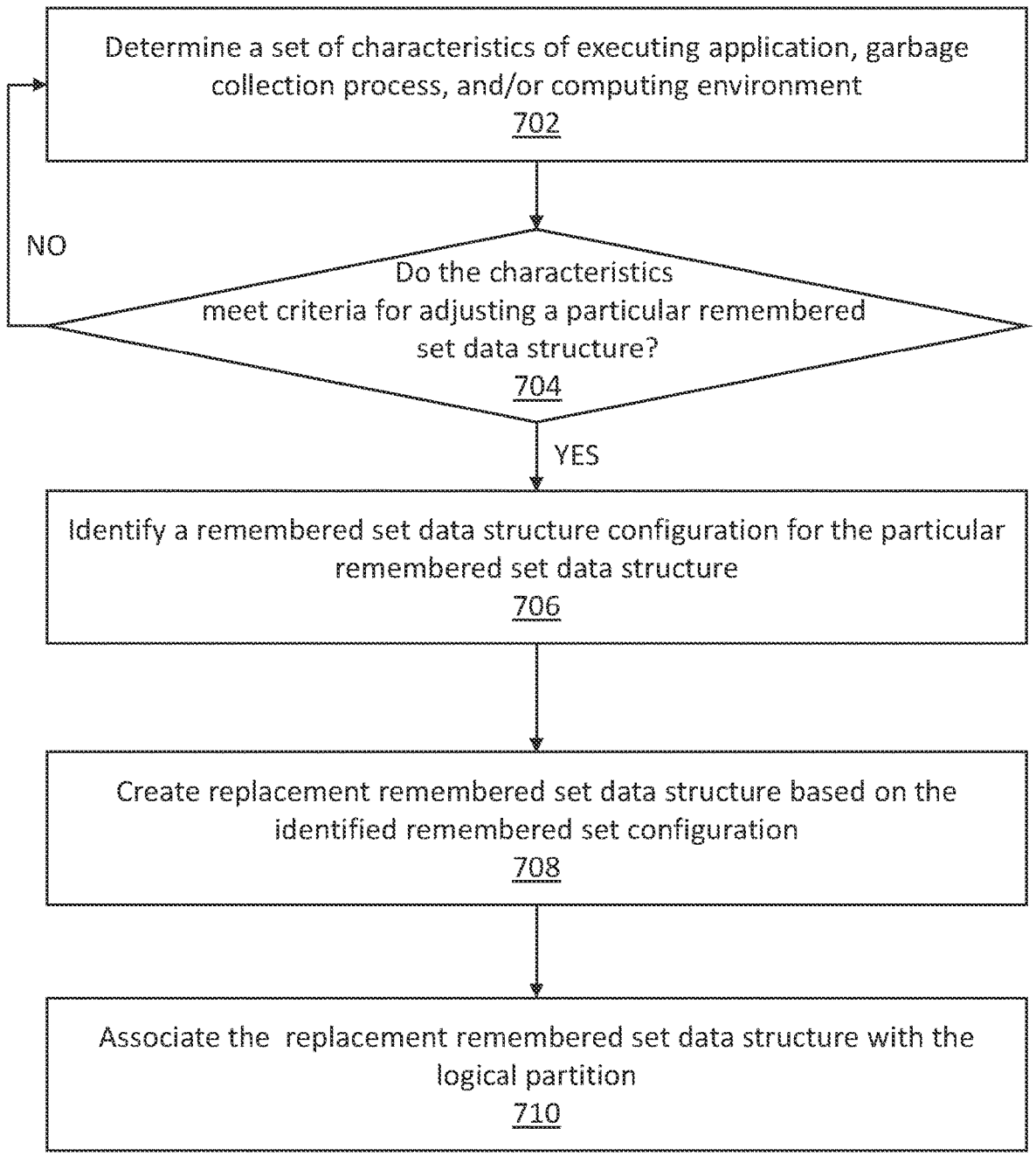
FIG. 7 illustrates an example set of operations for on-the-fly adaptation of one or more remembered set data structures, in accordance with one or more embodiments.

FIG. 7 illustrates an example set of operations for on-the-fly adaptation of one or more remembered set data structures. One or more operations illustrated in FIG. 7 may be modified, rearranged, or omitted all together. Accordingly, the particular sequence of operations illustrated in FIG. 7 should not be construed as limiting the scope of one or more embodiments.

A computing system may include a heap memory which is divided into a plurality of logical partitions. In some embodiments, a first subset of the plurality of logical partitions (e.g., those logical partitions that are in use) may each be associated with a remembered set data structure; a second subset of the plurality of logical partitions (e.g., those logical partitions that are not in use) may not be associated with any remembered set data structures.

The computing system may execute of one or more application threads. The computing system may also execute a garbage collection process for a plurality of objects stored in in the heap memory. In embodiments the garbage collection process is executed at least partially concurrently with the one or more application threads.

During execution of the application thread and/or the garbage collection process, the system may determine a set of characteristics (Operation 702). In some embodiments, the set of characteristics may be determined by the garbage collection process. The set of characteristics may include characteristics of the executing application thread, characteristics of the garbage collection process, and/or characteristics of the computing environment in which the application thread is executing.

In some embodiments, the set of characteristics may include one or more characteristics of an application thread. For example, the one or more characteristics may indicate whether the executing application thread is in a startup phase, a loaded phase, an idle phase, or some other phase.

The characteristics of the computing environment may include characteristics of the garbage collection process. For example, the characteristics may include garbage collector process settings, such as maximum heap size, maximum remembered set size, and service level agreements related to garbage collection latency. There are many features of the computing environment which may be used.

In some embodiments, the set of characteristics may include one or more characteristics of the computing environment in which the application thread is executing. The characteristics of the computing environment may include characteristics of the heap memory. For example, the one or more characteristics may indicate statistics such as average/median/n-percentile occupancy of the remembered set data structures. In embodiments, the statistics may take the management overheads of the existing remembered set data structures into account. In embodiments, the one or more characteristics may include storage efficiency (e.g., a ratio of memory used for storing remembered set entries to total memory used by a remembered set data structure). In embodiments, the set of characteristics may include an indication of a region type associated with a region (e.g., a region purpose as designated by a virtual machine, a generation to which the region belongs, etc.).

In some embodiments, the set of characteristics may include separate characteristics associated with the separate regions of the heap memory. Alternatively, the set of characteristics may include characteristics of the entire heap memory as a whole.

The system may determine whether one or more of the characteristics meets criteria for adjusting a remembered set data structure (Operation 704). For example, the system may compare one or more characteristics from the determined set of characteristics to one or more criteria. In some embodiments, at least one criterion, of the one or more criteria, may be associated with a single region, of the plurality of regions in the heap, and the system may perform the comparison multiple times (e.g., once for each of the regions of the heap). In some embodiments, at least one criterion, of the one or more criteria, is associated with the heap memory as a whole.

The one or more criteria may correspond to the set of characteristics determined in Operation 702. For example, the criteria may relate to one or more of the executing application thread, the garbage collection process, and/or the computing environment in which the application thread is executing.

As another example, one of the criteria may be based at least in part on a service level agreement associated with the garbage collection process. As a particular example, one of the criteria may be related to access latency during collection. The system may determine, based on the set of characteristics, that the access latency during collection is too high (e.g., exceeds a particular threshold).

As another example, one of the criteria may be related to memory use of a single remembered set data structure. In particular, the criteria may be a size of the single remembered set data structure, a storage efficiency (e.g., ratio of memory used to store remembered set entries and total memory used) of the single remembered set data structure, and/or an occupancy percentage of the single remembered set data structure.

As another example, one of the criteria may be related to overall remembered set data structure memory use. In particular, the criteria may be an aggregate size of the remembered set data structures, an aggregate storage efficiency (e.g., ratio of memory used to store remembered set entries and total memory used) of the remembered set data structures, and/or an aggregate occupancy percentage of the remembered set data structures.

As another example, one of the criteria may be based at least in part on a phase of the executing application thread. For example, the application thread phase may influence a threshold size of the remembered set (e.g., during idle times with less transient application memory use, the remembered set may be permitted to grow larger without increasing the overall memory footprint associated with the application). Alternatively, during a startup phase, a less dense remembered set (e.g., with smaller, more numerous cards) may be desirable because the garbage collection will require fewer processing resources to perform garbage collection activities, freeing processing resources for use by the application thread.

If the characteristics do not meet the criteria for adjusting a remembered set data structure (NO in Operation 704), the system can return to monitoring the characteristics at Operation 702.

If one or more of the characteristics meet the criteria for adjusting a remembered set data structure (YES in Operation 704), the system may identify a particular remembered set configuration (Operation 706). The identified particular remembered set configuration may correspond to a remembered set data structure that meets the one or more criteria.

In some embodiments, identifying a particular remembered set configuration may include selecting a remembered set configuration from among a plurality of candidate remembered set configurations. For example, the system may determine multiple candidate remembered set configurations having varying parameters (e.g., varying data structures and/or varying data structure sizes). Identifying the particular remembered set configuration may comprise selecting one of the multiple candidate remembered set configurations.

In some embodiments, identifying a particular remembered set configuration may include defining a set of remembered set data structure characteristics. For example, the system may select a remembered set data structure, and may calculate one or more remembered set data structure parameters based on the criteria (e.g., such that the characteristics fall below a defined threshold).

In some embodiments, identifying a particular remembered set configuration may comprise adjusting a number of remembered set data structures used to store the remembered set. For example, the system may alter the number of cards present in a region, such that more or fewer cards are present. The change to the number of cards may cause a corresponding change in the number of remembered set data structures.

In embodiments, the identified remembered set configuration may use less memory than an existing remembered set data structure and/or have a higher storage efficiency (e.g., ratio of memory used for storing remembered set entries and total memory used) relative to the existing remembered set data structure, while still being able to store all information contained in the existing remembered set data structure.

In embodiments, the identified remembered set configuration may be better able to meet one or more service level agreements associated with the garbage collection process, relative to the existing remembered set data structure. For example, the identified remembered set configuration may have an improved access latency during garbage collection, relative to the existing remembered set data structure.

The system may create a replacement remembered set data structure based on the identified remembered set configuration (Operation 708). In embodiments, creating a replacement remembered set data structure includes creating (e.g., instantiating) the data structure of the type indicated in the identified remembered set configuration, and having the parameters indicated in the identified remembered set configuration.

The system may associate the replacement remembered set data structure with a logical partition of the heap (Operation 710). In embodiments, associating the replacement remembered set data structure with a particular logical partition includes copying remembered set entries from a previous remembered set data structure associated with the particular logical partition to the replacement remembered set data structure. In embodiments, associating the replacement remembered set data structure with a particular logical partition includes adjusting one or more setting of the garbage collection process so that new remembered set entries are stored to the replacement remembered set data structure. In embodiments, the existing remembered set data structure may be deallocated following association of the replacement remembered set data structure.

6. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
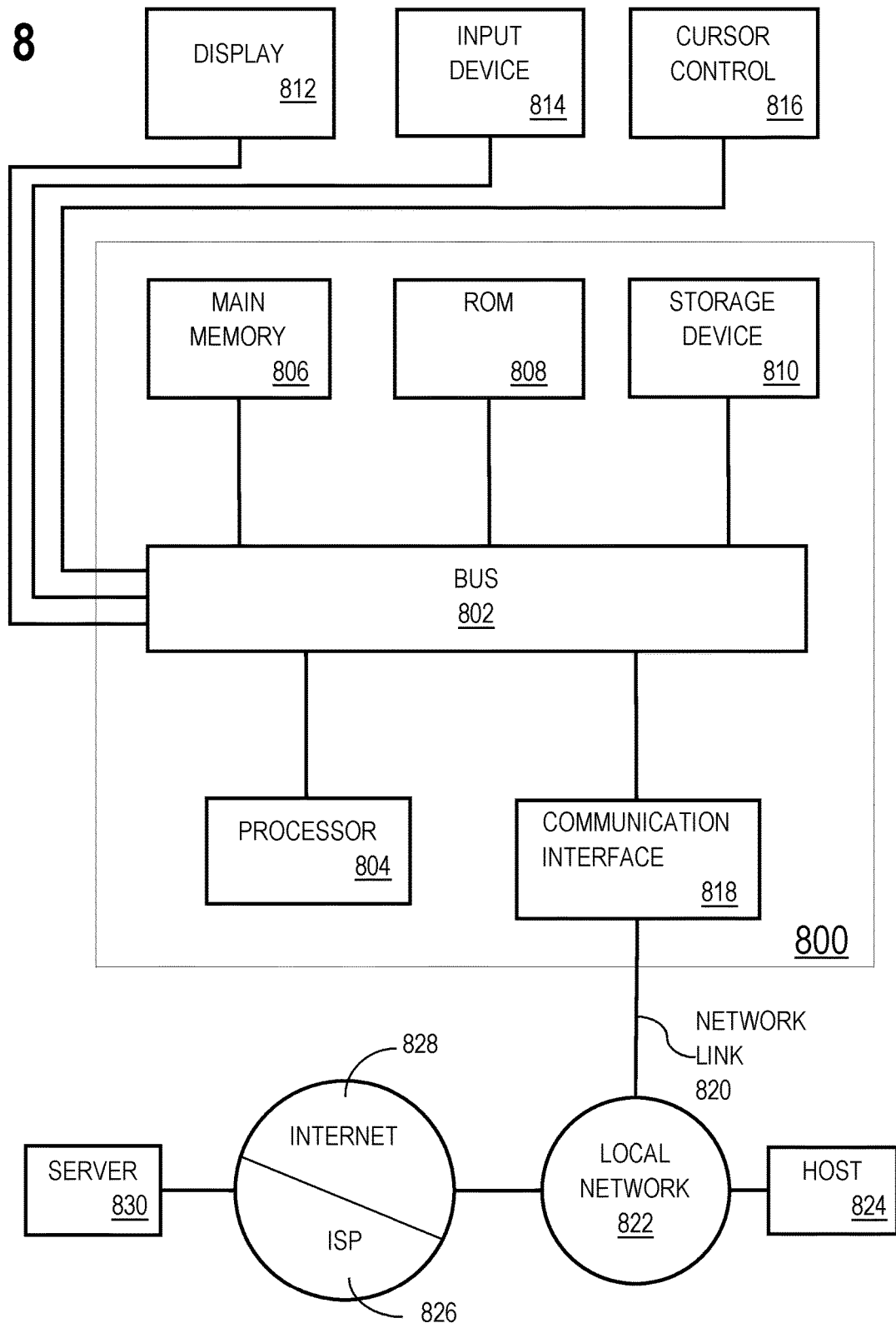
FIG. 8 illustrates a system in accordance with one or more embodiments.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer readable media comprising instructions which, when executed by one or more hardware processors, causes performance of operations comprising:
    initiating execution of an application thread;
    initiating execution of a garbage collection process for a plurality of objects in a heap memory, the heap memory including a first plurality of logical partitions, wherein each logical partition of the first plurality of logical partitions is associated with a remembered set data structure,
    wherein, for each particular logical partition of the first plurality of logical partitions, the corresponding remembered set data structure stores a set of addresses that (a) are external to the particular logical partition, and (b) include a reference to an object stored in the particular logical partition;
    while the application thread and the garbage collection process are executing:
        determining, by the garbage collection process, a set of characteristics corresponding to one or more of: (a) the executing application thread, (b) the plurality of logical partitions, or (c) the computing environment in which the application thread is executing;
        based on the set of characteristics meeting threshold criteria for adjusting a first remembered set data structure corresponding to a first logical partition:
            identifying a first remembered set configuration corresponding to the first remembered set data structure;
            creating a replacement remembered set data structure based on the first remembered set configuration;
            associating the replacement remembered set data structure with the first logical partition.

2. The media of claim 1, wherein the replacement remembered set data structure uses less memory than the first remembered set data structure and stores all the data from the first remembered set data structure.

3. The media of claim 1, wherein the replacement remembered set data structure has a higher storage efficiency than the first remembered set data structure and stores all the data from the first remembered set data structure.

4. The media of claim 1, wherein the replacement remembered set data structure causes the garbage collection process to have an improved access latency, relative to the first remembered set data structure, and stores all the data from the first remembered set data structure.

5. The media of claim 1, wherein identifying the first remembered set configuration comprises selecting the first remembered set configuration from a plurality of candidate remembered set configurations.

6. The media of claim 1, wherein identifying the first remembered set configuration comprises defining a set of remembered set data structure characteristics based at least in part on an execution phase of the application thread.

7. The media of claim 1, wherein determining the set of characteristics comprises determining an amount of memory designated for use by the remembered set.

8. The media of claim 1, wherein identifying the first remembered set configuration comprises selecting a new remembered set data structure.

9. The media of claim 1, the operations further comprising:
    copying one or more remembered set entries from the first remembered set data structure to the replacement remembered set data structure; and
    deallocating the first remembered set data structure.

10. A method comprising:
    initiating execution of an application thread;
    initiating execution of a garbage collection process for a plurality of objects in a heap memory, the heap memory including a first plurality of logical partitions, wherein each logical partition of the first plurality of logical partitions is associated with a remembered set data structure,
    wherein, for each particular logical partition of the first plurality of logical partitions, the corresponding remembered set data structure stores a set of addresses that (a) are external to the particular logical partition, and (b) include a reference to an object stored in the particular logical partition;
    while the application thread and the garbage collection process are executing:

determining, by the garbage collection process, a set of characteristics corresponding to one or more of: (a) the executing application thread, (b) the plurality of logical partitions, or (c) the computing environment in which the application thread is executing;

based on the set of characteristics meeting threshold criteria for adjusting a first remembered set data structure corresponding to a first logical partition:
 identifying a first remembered set configuration corresponding to the first remembered set data structure;
 creating a replacement remembered set data structure based on the first remembered set configuration;
 associating the replacement remembered set data structure with the first logical partition;

wherein the method is performed by at least one device including a hardware processor.

11. The method of claim 10, wherein the replacement remembered set data structure uses less memory than the first remembered set data structure and stores all the data from the first remembered set data structure.

12. The method of claim 10, wherein the replacement remembered set data structure has a higher storage efficiency than the first remembered set data structure and stores all the data from the first remembered set data structure.

13. The method of claim 10, wherein the replacement remembered set data structure causes the garbage collection process to have an improved access latency, relative to the first remembered set data structure, and stores all the data from the first remembered set data structure.

14. The method of claim 10, wherein identifying the first remembered set configuration comprises selecting the first remembered set configuration from a plurality of candidate remembered set configurations.

15. The method of claim 10, wherein identifying the first remembered set configuration comprises defining a set of remembered set data structure characteristics based at least in part on an execution phase of the application thread.

16. The method of claim 10, wherein determining the set of characteristics comprises determining an amount of memory designated for use by the remembered set.

17. The method of claim 10, wherein identifying the first remembered set configuration comprises selecting a new remembered set data structure.

18. The method of claim 10, further comprising:
copying one or more remembered set entries from the first remembered set data structure to the replacement remembered set data structure; and
deallocating the first remembered set data structure.

19. A system comprising:
at least one device including a hardware processor;
the system being configured to perform operations comprising:
initiating execution of an application thread;
initiating execution of a garbage collection process for a plurality of objects in a heap memory, the heap memory including a first plurality of logical partitions, wherein each logical partition of the first plurality of logical partitions is associated with a remembered set data structure,
wherein, for each particular logical partition of the first plurality of logical partitions, the corresponding remembered set data structure stores a set of addresses that (a) are external to the particular logical partition, and (b) include a reference to an object stored in the particular logical partition;
while the application thread and the garbage collection process are executing:
 determining, by the garbage collection process, a set of characteristics corresponding to one or more of: (a) the executing application thread, (b) the plurality of logical partitions, or (c) the computing environment in which the application thread is executing;
 based on the set of characteristics meeting threshold criteria for adjusting a first remembered set data structure corresponding to a first logical partition:
  identifying a first remembered set configuration corresponding to the first remembered set data structure;
  creating a replacement remembered set data structure based on the first remembered set configuration;
  associating the replacement remembered set data structure with the first logical partition.

20. The system of claim 19, further comprising:
copying one or more remembered set entries from the first remembered set data structure to the replacement remembered set data structure; and
deallocating the first remembered set data structure.

* * * * *